United States Patent
Zeiynali Farid et al.

(10) Patent No.: US 12,505,740 B2
(45) Date of Patent: Dec. 23, 2025

(54) SYSTEMS AND METHODS FOR PLANNING LANE-CHANGE ACTIONS CONSIDERING TRAFFIC STABILITY IN TARGET LANE

(71) Applicant: Toyota Motor Engineering & Manufacturing North America, Inc., Plano, TX (US)

(72) Inventors: Yashar Zeiynali Farid, Mountain View, CA (US); Sergei S. Avedisov, Mountain View, CA (US); Onur Altintas, Mountain View, CA (US); Kentaro Oguchi, Mountain View, CA (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 685 days.

(21) Appl. No.: 17/842,065

(22) Filed: Jun. 16, 2022

(65) Prior Publication Data
US 2023/0410651 A1    Dec. 21, 2023

(51) Int. Cl.
G08G 1/0968    (2006.01)
G08G 1/01    (2006.01)

(52) U.S. Cl.
CPC ......... G08G 1/0968 (2013.01); G08G 1/0104 (2013.01)

(58) Field of Classification Search
CPC ..... G08G 1/0968; G08G 1/0104; G08G 1/167
See application file for complete search history.

(56) References Cited

U.S. PATENT DOCUMENTS 10,089,876 B1 * 10/2018 Ramasamy ............ G05D 1/028
2013/0338868 A1 * 12/2013 Essame .................. G08G 1/167
701/23

(Continued)

FOREIGN PATENT DOCUMENTS

CN    109987093 A    7/2019
CN    109035862 B    4/2020

(Continued)

OTHER PUBLICATIONS

M. Shang, F. Hauer and R. Stern, "Do cut-ins matter: Assessing the impact of lane changing and string stability on traffic flow," 2020 IEEE 23rd International Conference on Intelligent Transportation Systems (ITSC), Rhodes, Greece, 2020, pp. 1-6, doi: 10.1109/ITSC45102.2020.9294587. (Year: 2020).*

(Continued)

*Primary Examiner* — Thomas Ingram
(74) *Attorney, Agent, or Firm* — Dinsmore & Shohl LLP (57) ABSTRACT

A method for planning lane-change actions considering string stability in a target lane is provided. The method includes learning a car following model based on training data related to a region, obtaining information about vehicles in a target lane in the region, simulating movements of the vehicles in the target lane responsive to an ego vehicle moving into the target lane based on the learned car following model and the information about the vehicles, determining whether the vehicles in the target lane will be string stable responsive to the ego vehicle moving into the target lane based on the simulated movements of the vehicles in the target lane, and instructing the ego vehicle to change lanes from a current lane to the target lane in response to determining that the vehicles in the target lane will be string stable responsive to the ego vehicle moving into the target lane.

20 Claims, 5 Drawing Sheets

(56) References Cited

U.S. PATENT DOCUMENTS

2017/0200371 A1* 7/2017 Glander ............... G08G 1/165
2019/0051159 A1* 2/2019 Wang ................. G05D 1/0027
2021/0116935 A1* 4/2021 Kalabic ................ G08G 1/22

FOREIGN PATENT DOCUMENTS

| CN | 109017792 B | 8/2020 |
|---|---|---|
| CN | 108919799 B | 11/2020 |
| CN | 113799798 A | 12/2021 |
| WO | 2018192352 A1 | 10/2018 |

OTHER PUBLICATIONS

Kang Sun, et al., "A Cooperative Lane Change Model for Connected and Autonomous Vehicles On Two Lanes Highway by Considering the Traffic Efficiency on Both Lanes", Journal of Transportation Research Interdisciplinary Perspectives, Mar. 2021, vol. 9.

Jianyu Xu, et al., "String Stability Guaranteed Lane Change Maneuver for Automated Vehicles with Vehicle-to-Vehicle Communication", Journal of IFAC-PapersOnLine, Jan. 1, 2021, vol. 54, No. 10, pp. 330-335.

George Gunter, et al., "Model-Based String Stability of Adaptive Cruise Control Systems Using Field Data", Journal of IEEE Transactions on Intelligent Vehicles, Mar. 2020, vol. 5, No. 1, pp. 90-99.

Jie Ni, et al., "Multivehicle Cooperative Lane Change Control Strategy for Intelligent Connected Vehicle", Journal of Advanced Transportation, Feb. 28, 2020.

Zhen Wang, et al., "Review of Lane-Changing Maneuvers of Connected and Automated Vehicles: Models, Algorithms and Traffic Impact Analyses", Published Oct. 9, 2019, Journal of the Indian Institute of Science, Dec. 2019, vol. 99, No. 4, pp. 589-599.

Raphael E. Stern, et al., "Dissipation Of Stop- and-Go Waves Via Control of Autonomous Vehicles: Field Experiments", Journal of Transportation Research Part C: Emerging Technologies, May 4, 2017, vol. 89, pp. 205-221.

Xiaopeng Li, et al., "Stop- and-Go Traffic Analysis: Theoretical Properties, Environmental Impacts and Oscillation Mitigation", Journal of Transportation Research Part B: Methodological, Dec. 1, 2014, vol. 70, pp. 319-339.

Umer Khan, et al., "Analyzing Cooperative Lane Change Models for Connected Vehicles", Conference: Proceedings of the 3rd International Conference on Connected Vehicles and Expo (ICCVE), Nov. 3, 2014, pp. 1-7.

Zuduo Zheng, et al., "Freeway Traffic Oscillations: Microscopic Analysis of Formations and Propagations using Wavelet Transform", Journal of Procedia Social and Behavioral Sciences, Nov. 1, 2011, vol. 17, pp. 717-731.

* cited by examiner

SYSTEMS AND METHODS FOR PLANNING LANE-CHANGE ACTIONS CONSIDERING TRAFFIC STABILITY IN TARGET LANE

TECHNICAL FIELD

The present disclosure relates to systems and methods for predicting traffic stability or string stability of vehicles in a target lane responsive to an ego vehicle moving into the target lane.

BACKGROUND

Drivers perform mandatory and/or discretionary lane-changes to follow their route or improve their trip experience. Mandatory lane change decisions are made based on routes, turning points, or downstream blockages, while discretionary lane-change decisions are made based on general incentives such as increasing speed. Lane-change actions of vehicles can affect the efficiency of a traffic system. It has been shown that disturbances by lane-change actions in certain traffic densities can lead to traffic instabilities.

Traffic instabilities can result in stop-and-go waves which can reduce the capacity of the road and produce traffic congestion. Planning the actions of connected vehicles (CVs) considering the potential impact on traffic stability can improve the performance of the CVs and the whole traffic.

Accordingly, a need exists for systems and methods that plans lane-change actions considering traffic stability in a target lane responsive to an ego vehicle moving into the target lane.

SUMMARY

The present disclosure provides for predicting traffic stability or string stability of vehicles in a target lane.

In one embodiment, a method for estimating string stability in a target lane is provided. The method includes learning a car following model based on training data related to a region, obtaining information about vehicles in a target lane in the region, simulating movements of the vehicles in the target lane responsive to an ego vehicle moving into the target lane based on the learned car following model and the information about the vehicles, determining whether the vehicles in the target lane will be string stable responsive to the ego vehicle moving into the target lane based on the simulated movements of the vehicles in the target lane, and instructing the ego vehicle to change lanes from a current lane to the target lane in response to determining that the vehicles in the target lane will be string stable responsive to the ego vehicle moving into the target lane. The method includes activating a mitigation strategy in response to determining that the vehicles in the target lane will be string unstable responsive to the ego vehicle moving into the target lane.

In another embodiment, a system for estimating string stability in a target lane is provided. The system includes a processor programmed to perform operations comprising: learning a car following model based on training data related to a region; obtaining information about vehicles in the target lane in the region; simulating movements of the vehicles in the target lane responsive to an ego vehicle moving into the target lane based on the learned car following model and the information about the vehicles; determining whether the vehicles in the target lane will be string stable responsive to the ego vehicle moving into the target lane based on the simulated movements of the vehicles in the target lane; instructing the ego vehicle to change lanes from a current lane to the target lane in response to determining that the vehicles in the target lane will be string stable responsive to the ego vehicle moving into the target lane, and activating a mitigation strategy in response to determining that the vehicles in the target lane will be string unstable responsive to the ego vehicle moving into the target lane.

In another embodiment, a vehicle is provided. The vehicle includes one or more sensors configured to obtain information about vehicles in a target lane in a region, a processor, and an actuator. The processor is programmed to perform operations including learning a car following model based on training data related to the region, simulating movements of the vehicles in the target lane responsive to a vehicle moving into the target lane based on the learned car following model and the information about the vehicles, determining whether the vehicles in the target lane will be string stable responsive to the vehicle moving into the target lane based on the simulated movements of the vehicles in the target lane, and instructing the vehicle to change lanes from a current lane to the target lane in response to determining that the vehicles in the target lane will be string stable responsive to the vehicle moving into the target lane. The actuator is configured to drive the vehicle to change lanes from the current lane to the target lane These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

The embodiments disclosed herein include systems and methods for determining traffic stability in a target lane.

Figure 1A:
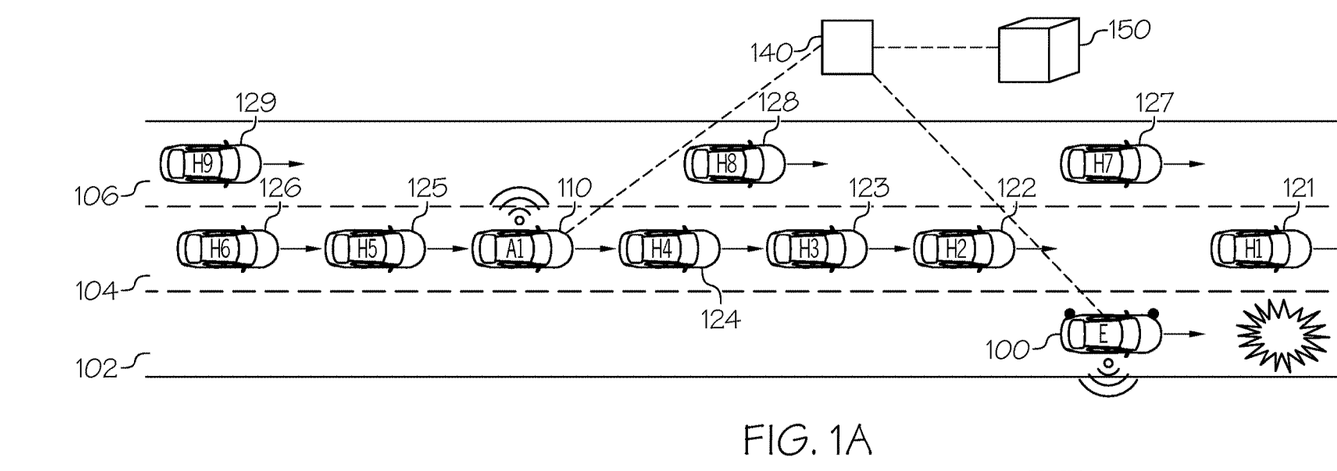
FIGS. 1A and 1B schematically depict an example scenario where unstable behavior of vehicles or string instability in a target lane is predicted in response to an ego vehicle changing lanes, in accordance with one or more embodiments shown and described herewith.
Figure 4A:
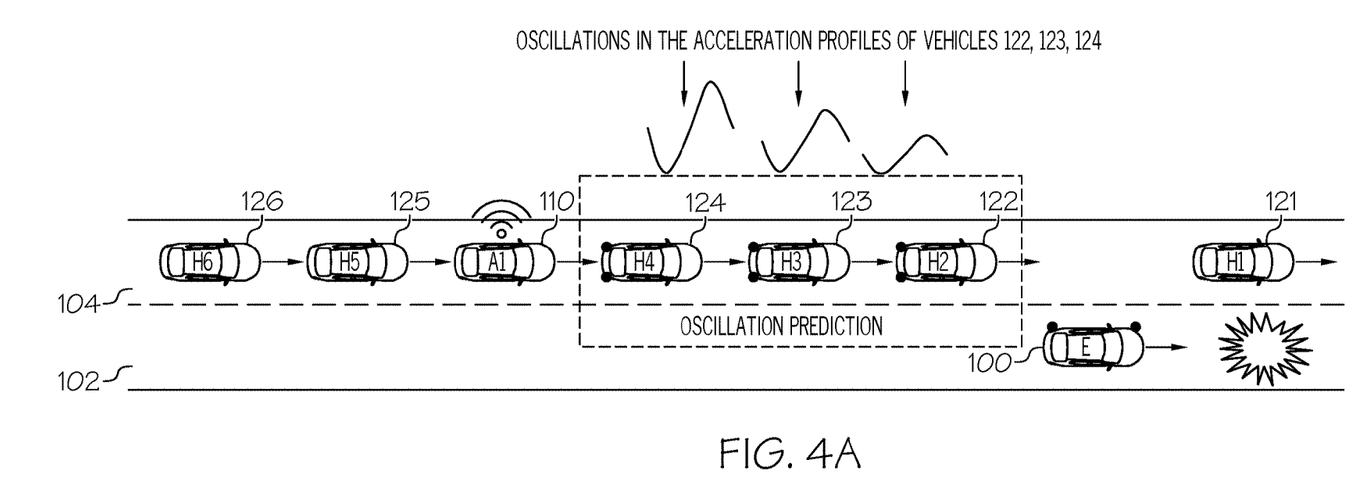
FIG. 4A depicts traffic instability in a target lane responsive to an ego vehicle moving into the target lane, according to one or more embodiments shown and described herein.
Figure 4B:
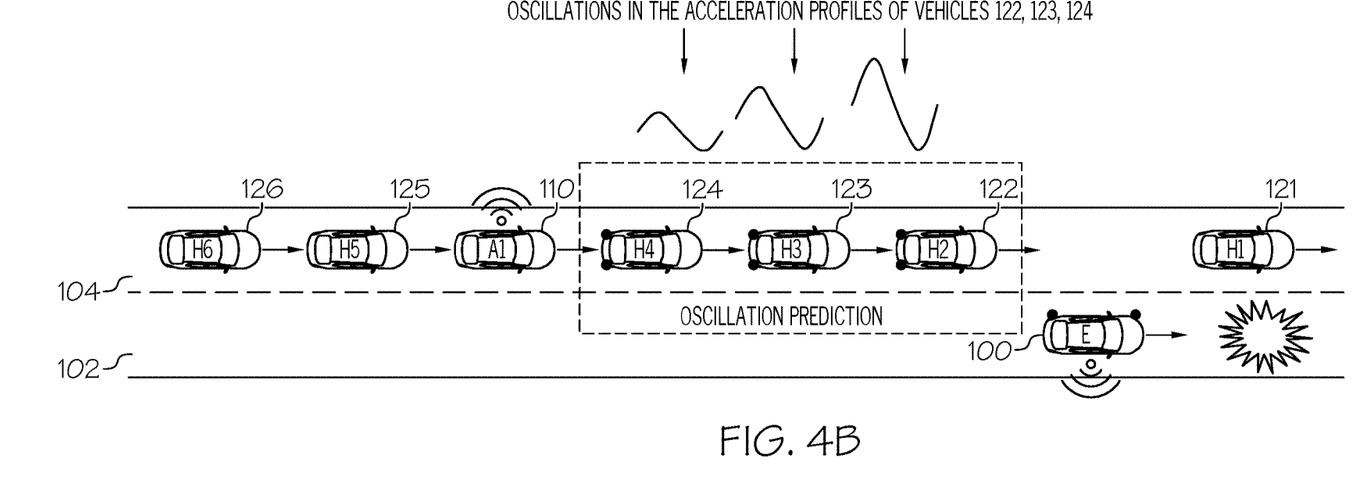
FIG. 4B depicts traffic stability in a target lane responsive to an ego vehicle moving into the target lane, according to one or more embodiments shown and described herein.

In embodiments, the present system learns a car following model based on training data related to a region, e.g., traffic data in the target lane 104 in a region in FIG. 1A. The system obtains information about vehicles in the target lane 104 in the region, such as gaps between vehicles, speeds of the vehicles, and speed differences between two adjacent vehicles. The system simulates movements of the vehicles in the target lane responsive to an ego vehicle moving into the target lane based on the learned car following model and the information about the vehicles. For example, the ego vehicle 100 estimates oscillation profiles of the vehicles in the target lane 104 responsive to the ego vehicle 100 moving into the target lane 104. The system determines whether the vehicles in the target lane 104 will be string stable responsive to the ego vehicle moving into the target lane based on the simulated movements of the vehicles in the target lane. For example, the system analyzes the pattern of oscillation propagated over the vehicles in the target lane 104 as shown in FIGS. 4A and 4B. Then, the system instructs the ego vehicle 100 to change lanes from a current lane 102 to the target lane 104 in response to determining that the vehicles in the target lane 104 will be string stable responsive to the ego vehicle 100 moving into the target lane 104.

Figure 1B:
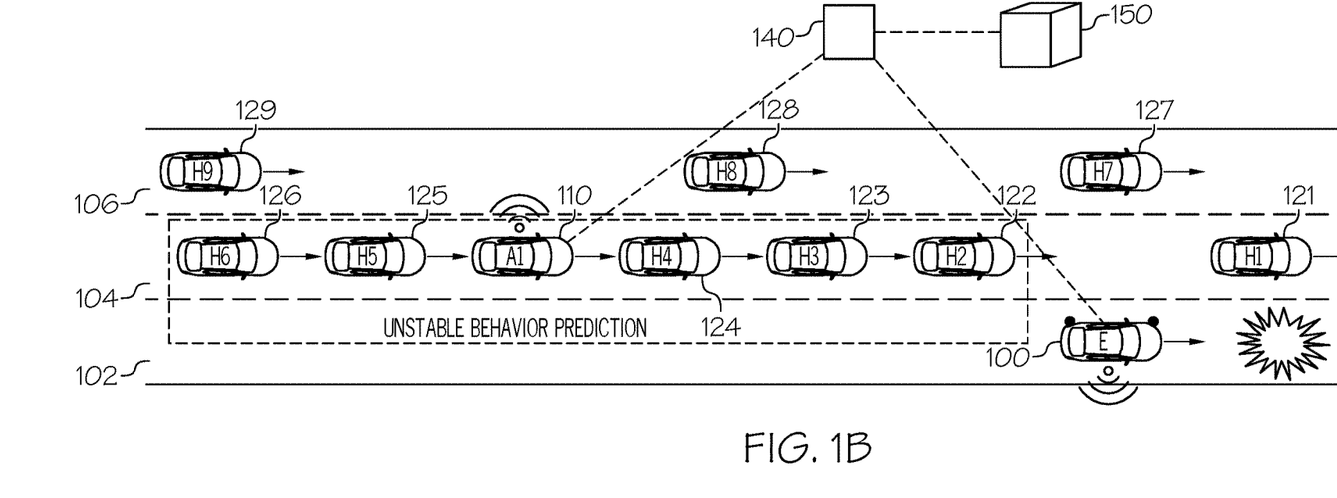

FIGS. 1A and 1B schematically depict an example scenario where unstable behavior of vehicles or string instability in a target lane is predicted in response to an ego vehicle changing lanes, in accordance with one or more embodiments shown and described herewith.

In FIG. 1A, a system includes an ego vehicle 100, a road side unit 140, and a server 150. The ego vehicle 100 identifies an obstacle in a lane 102, and plans to change lanes from the lane 102 to a target lane 104. In the target lane 104, a connected vehicle 110 and unconnected vehicles 121, 122, 123, 124, 125, and 126 are driving. Each of the ego vehicle 100, the connected vehicle 110, and the unconnected vehicles 121, 122, 123, 124, 125, and 126 may be a vehicle including an automobile or any other passenger or non-passenger vehicle such as, for example, a terrestrial, aquatic, and/or airborne vehicle. Unconnected vehicles 127, 128, 129 are driving in a third lane 106. In some embodiments, each of the ego vehicle 100 and the connected vehicle 110 may be an autonomous driving vehicle.

The ego vehicle 100 may detect the presence of the connected vehicle 110 and the unconnected vehicles 121, 122, 123, 124, 125, and 126 using sensors such as radar sensor, LIDAR sensors, cameras, or by communicating with the connected vehicle 110 via a vehicle-to-vehicle connection ("V2V connection"). The ego vehicle 100 may collect traffic information in the target lane 104. The traffic information may include the presence, speeds, and accelerations of connected or unconnected vehicles in the target lane 104, gaps between two adjacent vehicles, the traffic density of vehicles in the target lane 104, and the like. The presence, speeds, and/or accelerations of connected or unconnected vehicles in the target lane 104 may be obtained by the sensors of the ego vehicle 100. The traffic density may be estimated by a world model. The world model receives sensor data, wireless messages, and GPS data as input, and outputs traffic density estimation for the target lane 104.

In embodiments, the ego vehicle 100 may learn car-following behavior in the target lane 104. For example, the ego vehicle 100 may train a car-following model based on training data obtained from the vehicles in the target lane 104. The training data includes input data and output data for the car-following model. The input data includes a distance between a following vehicle and a leading vehicle (e.g., the vehicle 123 and the vehicle 122), a speed of the following vehicle, and a speed difference between the following vehicle and a leading vehicle. The output data includes an acceleration of the following vehicle. In some embodiments, the training data may include historical data previously obtained by other connected vehicles within the same or similar region as the region where the ego vehicle 100 locates. The ego vehicle 100 may train the car-following model to calibrate the parameters of the car-following model.

The car-following model may include, but not limited to, an optimal velocity model (OVM), intelligent driver model (IDM), and a Gipps car following model. As another example, a trained artificial intelligence model may consider the traffic density, dynamics of surrounding vehicles into account. In addition, this model may consider the trajectories that the ego vehicle, cooperative vehicles and other vehicles will take. Having an AI trained model or a lookup table trained on previous data in advance would allow for quick determination of which vehicle can cooperate with which vehicle, which may be critical in a dynamic task.

In some embodiments, the road side unit 140 or the server 150 may store a car-following model and train the car-following model based on training data obtained from connected vehicles in a region. For example, the connected vehicles 100 and 110 collect training data such as a distance between a following vehicle and a leading vehicle (e.g., the vehicle 123 and the vehicle 122), a speed of the following vehicle, a speed difference between the following vehicle and the leading vehicle, and an acceleration of the following vehicle and transmit the training data to the road side unit 140 or the server 150. Based on the received training data, the road side unit 140 or the server 150 trains the car-following model.

FIG. 1B depicts an example of the lane changing maneuver by the ego vehicle 100. The ego vehicle 100 may simulate the movements of the vehicles in the target lane 104 responsive to the ego vehicle 100 moving into the target lane 104 based on the learned car following model and the information about the vehicles. For example, the ego vehicle 100 collects information about the unconnected vehicles 122, 123, 124, 125, 126 and the connected vehicle 110 including the distance between two vehicles, the speed of a following vehicle, and the speed difference between the following vehicle and a leading vehicle. Then, the ego vehicle 100 estimates accelerations of the unconnected vehicles 122, 123, 124, 125, 126 and the connected vehicle 110 by inputting the information about the unconnected vehicles 122, 123, 124, 125, 126 and the connected vehicle 110 to the learned car-following model. Then, the ego vehicle predicts the driving behavior of the unconnected vehicles 122, 123, 124, 125, 126 and the connected vehicle 110 based on the estimated accelerations of the unconnected vehicles 122, 123, 124, 125, 126 and the connected vehicle 110.

The ego vehicle 100 may determine whether the vehicles in the target lane will be string stable responsive to the ego vehicle moving into the target lane based on the predicted movements of the unconnected vehicles 122, 123, 124, 125, 126 and the connected vehicle 110. For example, if the predicted movements of the unconnected vehicles 122, 123, 124, 125, 126 and the connected vehicle 110 show that an oscillation propagated over the unconnected vehicles 122, 123, 124, 125, 126 and the connected vehicle 110 in the target lane 104 increases, the ego vehicle 100 determines that the unconnected vehicles 122, 123, 124, 125, 126 and the connected vehicle 110 in the target lane 104 will be string unstable responsive to the ego vehicle 100 moving into the target lane 104, as illustrated in FIG. 1B. Specifically, in this example, the ego vehicle 100 may turn on left turn signals and initiate lane changing maneuver. In response to the left turn signals and/or the lane changing maneuver, the unconnected vehicle 122 may slightly break to provide a space for the ego vehicle 100 in the target lane 104. Then, the vehicles behind the unconnected vehicle 122 may further brake in response to the brake of the unconnected vehicle 122 as illustrated in FIG. 1B. Specifically, the unconnected vehicle 123 may break further than the unconnected vehicle 122, the unconnected vehicle 124 may break further than the unconnected vehicle 123, the connected vehicle 110 may break further than the unconnected vehicle 124, the unconnected vehicle 125 may break further than the connected vehicle 110, and the unconnected vehicle 126 may break further than the unconnected vehicle 125. This cascading of braking may lead to a stop-and-go jam and is referred to as string instability (a type of traffic instability), which shows that the oscillation propagated over the unconnected vehicles 122, 123, 124, 125, 126 and the connected vehicle 110 in the target lane 104 increases. If the traffic in the target lane 104 will be string unstable, the present system may take actions to mitigate the traffic instabilities, e.g., by instructing a connected vehicle in the target lane 104 to change lanes, or instructing the connected vehicle in the target lane 104 to follow a certain speed profile If the predicted movements of the unconnected vehicles 122, 123, 124, 125, 126 and the connected vehicle 110 show that an oscillation propagated over the unconnected vehicles 122, 123, 124, 125, 1126 and the connected vehicle 110 in the target lane 104 decreases, the ego vehicle 100 determines that the unconnected vehicles 122, 123, 124, 125, 126 and the connected vehicle 110 in the target lane 104 will be string stable even responsive to the ego vehicle 100 moving into the target lane 104. Then, the ego vehicle 100 may change lanes from the current lane 102 to the target lane 104.

Figure 2:
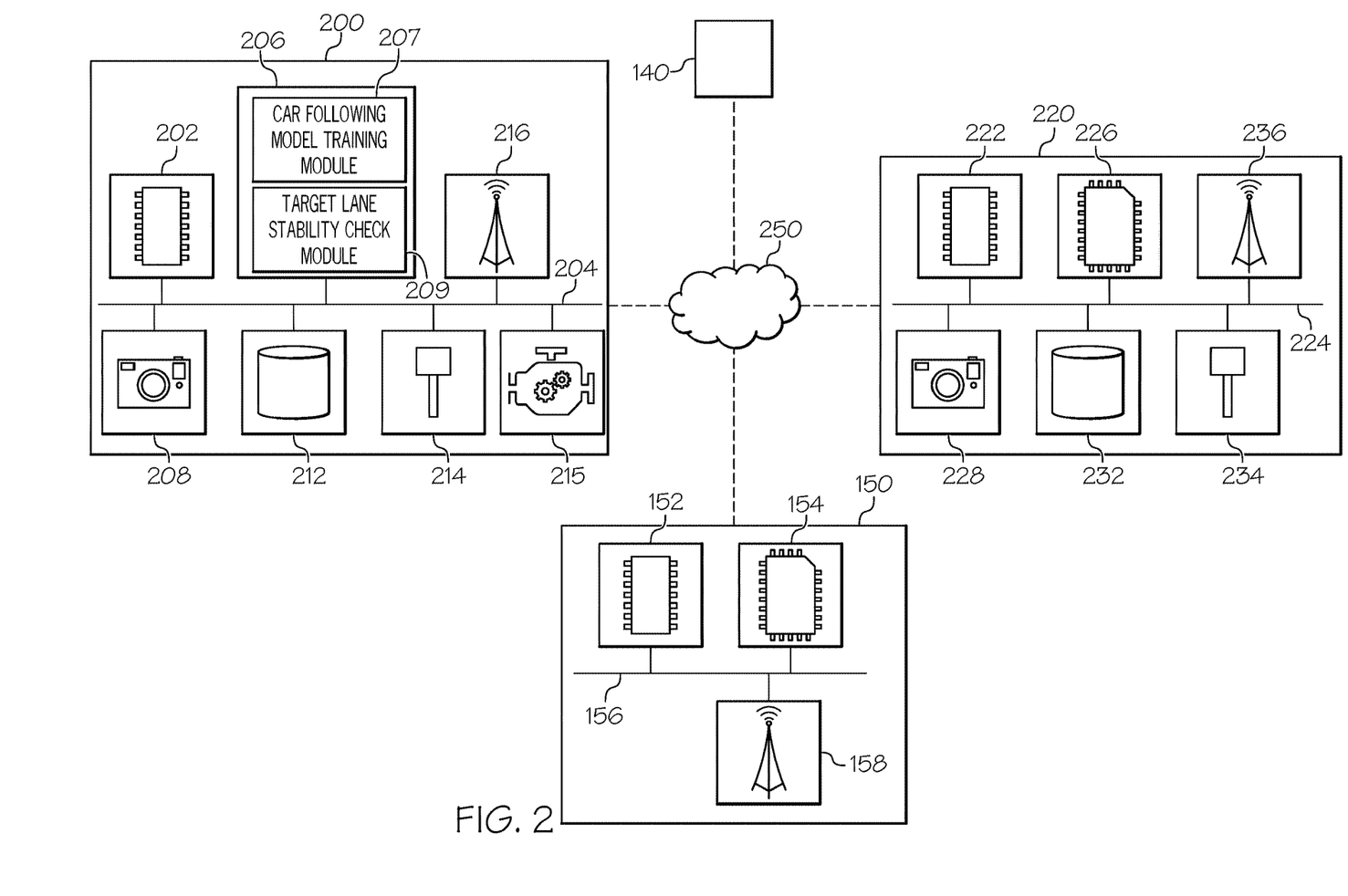
FIG. 2 depicts a schematic diagram of a system for predicting traffic stability in a target lane, according to one or more embodiments shown and described herein.

FIG. 2 depicts a schematic diagram of a system for predicting traffic stability in a target lane, according to one or more embodiments shown and described herein. The system includes an ego vehicle system 200, a connected vehicle system 220, a road side unit 140, and a server 150.

It is noted that, while the ego vehicle system 200, and the connected vehicle system 220 are depicted in isolation, each of the ego vehicle system 200, and the connected vehicle system 220 may be included within a vehicle in some embodiments, for example, respectively within each of the ego vehicle 100 and the connected vehicle 110 of FIG. 1. While FIG. 2 depicts that the ego vehicle system 200 communicates with one connected vehicle system 220, the ego vehicle system 200 may communicate with more than one connected vehicle system. In embodiments, each of the ego vehicle system 200 and the connected vehicle system 220 may be included within a vehicle that may be an automobile or any other passenger or non-passenger vehicle such as, for example, a terrestrial, aquatic, and/or airborne vehicle. In some embodiments, the vehicle may be an autonomous vehicle that navigates its environment with limited human input or without human input.

The ego vehicle system 200 includes one or more processors 202. Each of the one or more processors 202 may be any device capable of executing machine readable and executable instructions. Accordingly, each of the one or more processors 202 may be a controller, an integrated circuit, a microchip, a computer, or any other computing device. The one or more processors 202 are coupled to a communication path 204 that provides signal interconnectivity between various modules of the system. Accordingly, the communication path 204 may communicatively couple any number of processors 202 with one another, and allow the modules coupled to the communication path 204 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 204 may be formed from any medium that is capable of transmitting a signal such as, for example, conductive wires, conductive traces, optical waveguides, or the like. In some embodiments, the communication path 204 may facilitate the transmission of wireless signals, such as WiFi, Bluetooth®, Near Field Communication (NFC), and the like. Moreover, the communication path 204 may be formed from a combination of mediums capable of transmitting signals. In one embodiment, the communication path 204 comprises a combination of conductive traces, conductive wires, connectors, and buses that cooperate to permit the transmission of electrical data signals to components such as processors, memories, sensors, input devices, output devices, and communication devices. Accordingly, the communication path 204 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The ego vehicle system 200 includes one or more memory modules 206 coupled to the communication path 204. The one or more memory modules 206 may comprise RAM, ROM, flash memories, hard drives, or any device capable of storing machine readable and executable instructions such that the machine readable and executable instructions can be accessed by the one or more processors 202. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 206. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components. The one or more processors 202 along with the one or more memory modules 206 may operate as a controller for the ego vehicle system 200.

The one or more memory modules 206 includes a car following model training module 207 and a target lane stability check module 209. The car following model training module 207 and the target lane stability check module 209 work together to estimate traffic stability in a target lane, e.g., the target lane 104 in FIGS. 1A and 1B. Each of the car following model training module 207 and the target lane stability check module 209 may be a program module in the form of operating systems, application program modules, and other program modules stored in one or more memory modules 206. In some embodiments, the program module may be stored in a remote storage device that may communicate with the ego vehicle system 200, for example, in the server 150 or the road side unit 140 in FIGS. 1A and 1B. Such a program module may include, but is not limited to, routines, subroutines, programs, objects, components, data structures, and the like for performing specific tasks or executing specific data types as will be described below.

In embodiments, the car following model training module 207 is a module that trains a car following model based on field data. The car following model may receive input data related to driving information about a vehicle and output a desired acceleration for the vehicle. For example, the car following model training module 207 may be Optimal Velocity with relative velocity term (OVRV) model. The OVRV model outputs a desired acceleration $\dot{v}$ based on the following equation.

$$\dot{v}=f(s,v,\Delta v)=k_1(s-\eta-\tau_e v)+k_2(\Delta v) \quad \text{Equation (1)}$$

Where s is a gap between a following vehicle and a leading vehicle, v is a speed of the following vehicle, and $\Delta v$ is a speed difference between the following vehicle and the leading vehicle. Data s, v, $\Delta v$ are input to the OVRV model f( ). Parameters $k_1$, $k_2$, $\tau_e$, and $\eta$ are parameters of the OVRV model. The car following model training module 207 trains and calibrates the parameters of the car following model based on field data that may be obtained from vehicle sensors, road-side units, or other sensors. For example, the field data may be a plurality of sets of a gap between a following vehicle and a leading vehicle, a speed of the following vehicle, a speed difference between the following vehicle and the leading vehicle, and the actual acceleration of the following vehicle. Based on the field data, the car following model training module 207 may calibrate the parameters $k_1$, $k_2$, $\tau_e$, and $\eta$.

The target lane stability check module 209 predicts traffic stability or string stability in a target lane responsive to an ego vehicle moving into the target lane. By referring to FIG. 1A, the target lane stability check module 209 may localize vehicles in the target lane 104. For example, the ego vehicle 100 may localize the unconnected vehicles 122, 123, 124, 125, 126 and the connected vehicle 110 using its sensors. The connected vehicle 110 may also localize vehicles in the target lane 104 and transmit information about the localized vehicles to the ego vehicle 100. As another example, the road side unit 140 or the server 150 may localize the vehicles in the target lane 104.

When all vehicles in the target lane 104 are connected vehicles, the ego vehicle 100 may obtain location information from the connected vehicles and localize all connected vehicles. If both connected and non-connected vehicles are present in the target lane 104, connected vehicles may utilize their sensors localize non-connected vehicles. If the sensors of the connected vehicles cannot cover all vehicles in the target lane 104, the target lane stability check module 209 may estimate a local density in the target lane using the sensors of the connected vehicles. The local densities may be used to estimate average gap and speed (e.g., s and v in the OVRV model) as well as the number of vehicles between connected vehicles (e.g., the ego vehicle 100 and the connected vehicle 110).

Then, the target lane stability check module 209 predicts traffic stability or string stability in a target lane responsive to an ego vehicle moving into the target lane based on information about the localized vehicles in the target lane, the car-following model learned by the car following model training module 207, and the estimated model parameters of the car-following model.

For example, by referring to FIG. 1A, the target lane stability check module 209 may simulate the movements of the vehicles in the target lane 104 responsive to the ego vehicle 100 moving into the target lane 104 based on the learned car following model and the information about the localized vehicles. The target lane stability check module 209 estimates accelerations of the unconnected vehicles 122, 123, 124, 125, 126 and the connected vehicle 110 by inputting the information about the unconnected vehicles 122, 123, 124, 125, 126 and the connected vehicle 110 to the learned car-following model. Then, the target lane stability check module 209 predicts the driving behavior of the unconnected vehicles 122, 123, 124, 125, 126 and the vehicle 110 based on the estimated accelerations of the unconnected vehicles 122, 123, 124, 125, 126 and the vehicle 110.

The target lane stability check module 209 may determine whether the vehicles in the target lane will be string stable responsive to the ego vehicle 100 moving into the target lane based on the predicted movements of the unconnected vehicles 122, 123, 124, 125, 126 and the connected vehicle 110. For example, if the predicted movements of the unconnected vehicles 122, 123, 124, 125, 126 and the connected vehicle 110 show that an oscillation propagated over the unconnected vehicles 122, 123, 124, 125, 126 and the connected vehicle 110 in the target lane 104 increases, the target lane stability check module 209 determines that the unconnected vehicles 122, 123, 124, 125, 126 and the connected vehicle 110 in the target lane 104 will be string unstable responsive to the ego vehicle 100 moving into the target lane 104, as illustrated in FIG. 1B.

If the predicted movements of the unconnected vehicles 122, 123, 124, 125, 126 and the connected vehicle 110 show that an oscillation propagated over the unconnected vehicles 122, 123, 124, 125, 126 and the connected vehicle 110 in the target lane 104 decreases, the target lane stability check module 209 determines that the unconnected vehicles 122, 123, 124, 125, 126 and the connected vehicle 110 in the target lane 104 will be string stable even responsive to the ego vehicle 100 moving into the target lane 104.

Referring still to FIG. 2, the ego vehicle system 200 comprises one or more sensors 208. The one or more sensors 208 may be any device having an array of sensing devices capable of detecting radiation in an ultraviolet wavelength band, a visible light wavelength band, or an infrared wavelength band. The one or more sensors 208 may detect the presence of other vehicles such as the connected vehicle 110 and the unconnected vehicles 121, 122, 123, 124, 125, and 126 in FIG. 1A, and/or the distance between the ego vehicle 100 and the connected vehicle 110 and the unconnected vehicles 121, 122, 123, 124, 125, and 126. The one or more sensors 208 may have any resolution. In some embodiments, one or more optical components, such as a mirror, fish-eye lens, or any other type of lens may be optically coupled to the one or more sensors 208. In embodiments described herein, the one or more sensors 208 may provide image data to the one or more processors 202 or another component communicatively coupled to the communication path 204. In some embodiments, the one or more sensors 208 may also provide navigation support. That is, data captured by the one or more sensors 208 may be used to autonomously or semi-autonomously navigate the ego vehicle 100.

In some embodiments, the one or more sensors 208 include one or more imaging sensors configured to operate in the visual and/or infrared spectrum to sense visual and/or infrared light. Additionally, while the particular embodiments described herein are described with respect to hardware for sensing light in the visual and/or infrared spectrum, it is to be understood that other types of sensors are contemplated. For example, the systems described herein could include one or more LIDAR sensors, radar sensors, sonar sensors, or other types of sensors for gathering data that could be integrated into or supplement the data collection described herein. Ranging sensors like radar sensors may be used to obtain a rough depth and speed information for the view of the ego vehicle system 200.

The ego vehicle system 200 comprises a satellite antenna 214 coupled to the communication path 204 such that the communication path 204 communicatively couples the satellite antenna 214 to other modules of the ego vehicle system 200. The satellite antenna 214 is configured to receive signals from global positioning system satellites. Specifically, in one embodiment, the satellite antenna 214 includes one or more conductive elements that interact with electromagnetic signals transmitted by global positioning system satellites. The received signal is transformed into a data signal indicative of the location (e.g., latitude and longitude) of the satellite antenna 214 or an object positioned near the satellite antenna 214, by the one or more processors 202.

The ego vehicle system 200 comprises one or more vehicle sensors 212. Each of the one or more vehicle sensors 212 is coupled to the communication path 204 and communicatively coupled to the one or more processors 202. The one or more vehicle sensors 212 may include one or more motion sensors for detecting and measuring motion and changes in motion of the ego vehicle 100. The motion sensors may include inertial measurement units. Each of the one or more motion sensors may include one or more accelerometers and one or more gyroscopes. Each of the one or more motion sensors transforms sensed physical movement of the vehicle into a signal indicative of an orientation, a rotation, a velocity, or an acceleration of the vehicle.

Still referring to FIG. 2, the ego vehicle system 200 comprises network interface hardware 216 for communicatively coupling the ego vehicle system 200 to the connected vehicle system 220. The network interface hardware 216 can be communicatively coupled to the communication path 204 and can be any device capable of transmitting and/or receiving data via a network. Accordingly, the network interface hardware 216 can include a communication transceiver for sending and/or receiving any wired or wireless communication. For example, the network interface hardware 216 may include an antenna, a modem, LAN port, WiFi card, WiMAX card, mobile communications hardware, near-field communication hardware, satellite communication hardware and/or any wired or wireless hardware for communicating with other networks and/or devices. In one embodiment, the network interface hardware 216 includes hardware configured to operate in accordance with the Bluetooth® wireless communication protocol. The network interface hardware 216 of the ego vehicle system 200 may transmit its data to the connected vehicle system 220. For example, the network interface hardware 216 of the ego vehicle system 200 may transmit vehicle data, location data, maneuver data and the like to other connected vehicles, a cloud server, edge servers, and the like.

The ego vehicle system 200 may connect with one or more external vehicle systems (e.g., the connected vehicle system 220) and/or external processing devices (e.g., the server 150, or the road side unit 140) via a direct connection. The direct connection may be a vehicle-to-vehicle connection ("V2V connection"), a vehicle-to-everything connection ("V2X connection"), or, a mmWave connection. The V2V or V2X connection or mmWave connection may be established using any suitable wireless communication protocols discussed above. A connection between vehicles may utilize sessions that are time-based and/or location-based. In embodiments, a connection between vehicles or between a vehicle and an infrastructure element may utilize one or more networks to connect, which may be in lieu of, or in addition to, a direct connection (such as V2V, V2X, mmWave) between the vehicles or between a vehicle and an infrastructure. The ego vehicle system 200 may communicate with external communicate vehicle systems using wireless messages such as basic safety messages (BSMs), maneuver massages (MMs), and the like. BSM is a wireless message transmitted between vehicles where the transmitter sends its position, speed and other static/dynamic information. MM is a general class of wireless messages exchanged between road users and infrastructure that contains the future trajectory (or possible future trajectories) of the transmitting road user. Specific examples of such messages could be the Maneuver Coordination Message (MCM) or the Maneuver Sharing Coordination Message (MSCM).

By way of non-limiting example, vehicles may function as infrastructure nodes to form a mesh network and connect dynamically on an ad-hoc basis. In this way, vehicles may enter and/or leave the network at will, such that the mesh network may self-organize and self-modify over time. Other non-limiting network examples include vehicles forming peer-to-peer networks with other vehicles or utilizing centralized networks that rely upon certain vehicles and/or infrastructure elements. Still other examples include networks using centralized servers and other central computing devices to store and/or relay information between vehicles.

Still referring to FIG. 2, the ego vehicle system 200 may be communicatively coupled to the connected vehicles system 220, the road side unit 140 or the server 150 by the network 250. In one embodiment, the network 250 may include one or more computer networks (e.g., a personal area network, a local area network, or a wide area network), cellular networks, satellite networks and/or a global positioning system and combinations thereof. Accordingly, the ego vehicle system 200 can be communicatively coupled to the network 250 via a wide area network, via a local area network, via a personal area network, via a cellular network, via a satellite network, etc. Suitable local area networks may include wired Ethernet and/or wireless technologies such as, for example, Wi-Fi. Suitable personal area networks may include wireless technologies such as, for example, IrDA, Bluetooth®, Wireless USB, Z-Wave, ZigBee, and/or other near field communication protocols. Suitable cellular networks include, but are not limited to, technologies such as LTE, WiMAX, UMTS, CDMA, and GSM.

The ego vehicle system 200 may include an actuator 215 such as a motor, an engine, and any other powertrain that drives the ego vehicle system 200. The actuator 215 is coupled to the communication path 204 and communicatively coupled to the one or more processors 202.

Still referring to FIG. 2, the connected vehicle system 220 includes one or more processors 222, one or more memory modules 226, one or more sensors 228, one or more vehicle sensors 233, a satellite antenna 235, and a communication path 224 communicatively connected to the other components of the connected vehicle system 220. The components of the connected vehicle system 220 may be structurally similar to and have similar functions as the corresponding components of the ego vehicle system 200 (e.g., the one or more processors 222 corresponds to the one or more processors 202, the one or more memory modules 226 corresponds to the one or more memory modules 206, the one or more sensors 228 corresponds to the one or more sensors 208, the one or more vehicle sensors 233 corresponds to the one or more vehicle sensors 212, the satellite antenna 235 corresponds to the satellite antenna 214, the communication path 224 corresponds to the communication path 204, and the network interface hardware 236 corresponds to the network interface hardware 216). The one or more memory modules 226 may store a car following model training module and a target lane stability check module similar to the car following model training module 207 and the target lane stability check module 209.

Figure 3:
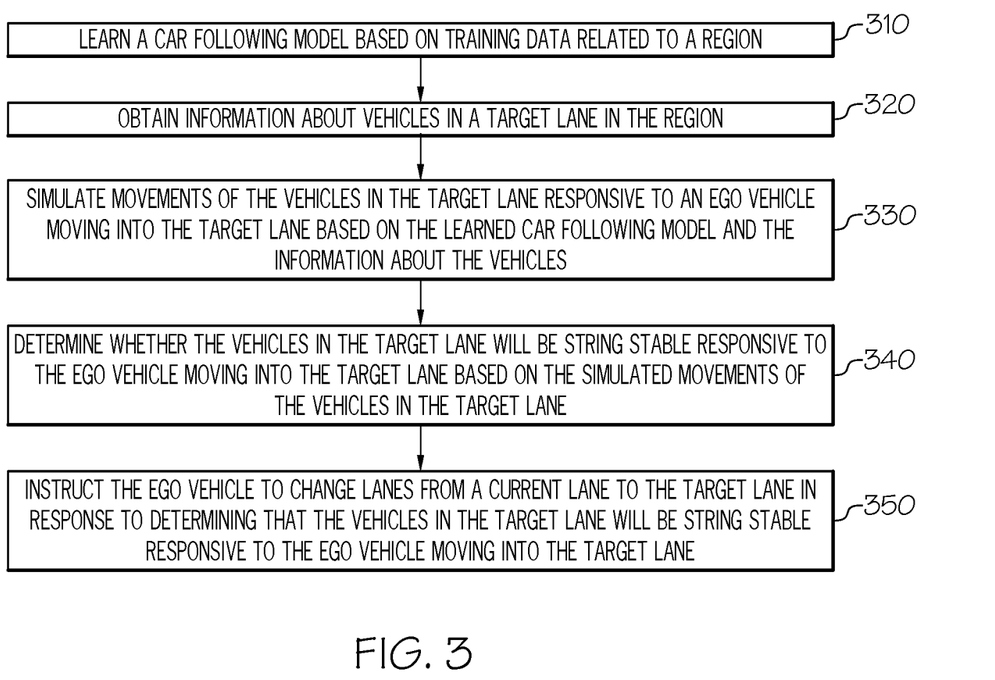
FIG. 3 depicts a flowchart for performing a density reduction strategy in a target lane, according to one or more embodiments shown and described herein.

FIG. 3 depicts a flowchart for performing a lane-change considering stability in a target lane, according to one or more embodiments shown and described herein. The flowchart is described with reference to FIGS. 1A, 1B, 2 and 4A-4B of the present application.

In step 310, an ego vehicle learns a car following model based on training data related to a region. For example, by referring to FIG. 1A, the ego vehicle 100 may train a car following model based on field data. The car following model may include, but not limited to, an optimal velocity model (OVM), intelligent driver model (IDM), and a Gipps car following model. The car following model may receive input data related to driving information about a vehicle and output a desired acceleration for the vehicle. The field data may be a plurality of sets of a gap between a following vehicle and a leading vehicle, a speed of the following vehicle, a speed difference between the following vehicle and the leading vehicle, and the actual acceleration of the following vehicle. For example, the field data may include a set of a gap between the unconnected vehicle 123 and the unconnected vehicle 122, the speed of the unconnected vehicle 123, a speed difference between the unconnected vehicle 123 and the unconnected vehicle 122, and the acceleration of the unconnected vehicle 123. As another example, the field data may include a set of a gap between the unconnected vehicle 124 and the unconnected vehicle 123, the speed of the unconnected vehicle 124, a speed difference between the unconnected vehicle 124 and the unconnected vehicle 124, and the acceleration of the unconnected vehicle 124. In some embodiments, the road side unit 140 may store a car following model and learn the car following model based on field data obtained from the unconnected vehicles 122, 123, 124, 125, 126 and the connected vehicle 110. The road side unit 140 may transmit the learned car following model to the ego vehicle 100. In some embodiments, the car following model may be learned based on historical data that was previously obtained from vehicles in the same region.

In step 320, the ego vehicle obtains information about vehicles in a target lane in the region. For example, by referring to FIG. 1A, the ego vehicle 100 may obtain traffic data from the target lane 104. The traffic data may include the presence and speed of connected or unconnected vehicles in the target lane 104, a gap between two adjacent vehicles in the target lane 104, the traffic density of vehicles in the target lane 104, and the like. The presence and speed of connected or unconnected vehicles and the gaps between vehicles in the target lane 104 may be obtained by the sensors of the ego vehicle 100. The traffic density may be estimated by a world model. The world model receives sensor data, wireless messages, and GPS data as input, and outputs traffic density estimation for the target lane 104.

In step 330, the ego vehicle simulates movements of the vehicles in the target lane responsive to an ego vehicle moving into the target lane based on the learned car following model and the information about the vehicles. For example, the ego vehicle 100 may predict the acceleration profiles of the unconnected vehicle 122, 123, 124, 125, 126 and the connected vehicle 110 responsive to the ego vehicle 100 changing lanes from the lane 102 to the target lane 104 based on the learned car following model obtained in step 310 and the information about the unconnected vehicles 122, 123, 124, 125, 126 and the connected vehicle 110 obtained in obtained in step 320. Specifically, the acceleration profile of the unconnected vehicle 122 may be determined by inputting an expected gap between the unconnected vehicle 122 and the ego vehicle 100, the speed of the unconnected vehicle 122, and a speed difference between the unconnected vehicle 122 and the ego vehicle to the learned car following model. In a similar manner, the acceleration profiles for the unconnected vehicles 123, 124, 125, 126 and the connected vehicle 110 may be predicted.

In step 340, the ego vehicle determines whether the vehicles in the target lane will be string stable responsive to the ego vehicle moving into the target lane based on the simulated movements of the vehicles in the target lane.

For example, by referring to FIG. 4A, the ego vehicle 100 determines whether the vehicles in the target lane will be string stable responsive to the ego vehicle moving into the target lane based on the acceleration profiles of the unconnected vehicles 122, 123, 124, 125, 126 and the connected vehicle 110. The ego vehicle 100 may determine that the unconnected vehicles 122, 123, 124, 125, 126 and the connected vehicle 110 in the target lane 104 will be string unstable responsive to the ego vehicle 100 moving into the target lane 104 if the oscillation propagated over the vehicles in the target lane 104 increases as illustrated in FIG. 4A. Specifically, the oscillation in the predicted acceleration profile of the unconnected vehicle 123 is greater than the oscillation in the predicted acceleration profile of the unconnected vehicle 122, and the oscillation in the acceleration profile of the unconnected vehicle 124 is greater than the oscillation in the acceleration profile of the unconnected vehicle 123. Then, the ego vehicle 100 determines that the unconnected vehicles 122, 123, 124 in the target lane will be string unstable.

The ego vehicle 100 may determine that the unconnected vehicles 122, 123, 124, 125, 126 and the connected vehicle 110 in the target lane 104 will be string stable responsive to the ego vehicle 100 moving into the target lane 104 if the oscillation propagated over the vehicles in the target lane 104 decreases as illustrated in FIG. 4B. Specifically, the oscillation in the predicted acceleration profile of the unconnected vehicle 123, is smaller than the oscillation in the predicted acceleration profile of the unconnected vehicle 122, and the oscillation in the acceleration profile of the unconnected vehicle 124 is smaller than the oscillation in the acceleration profile of the unconnected vehicle 123. Then, the ego vehicle 100 determines that the unconnected vehicles 122, 123, 124 in the target lane will be string stable.

In some embodiments, the ego vehicle may determine whether the vehicles in the target lane will be string stable responsive to the ego vehicle moving into the target lane based on parameters of a learned car following model. For example, the learned car following model may be OVRV model. If the following inequality holds true, then the ego vehicle 100 may predict that the traffic in the target lane 104 will be string stable.

$$\frac{-k_1}{k_1^3 \tau_e^3}\left[\frac{k_1^2 \tau_e^2}{2} + k_1 k_2 \tau_e - k_1\right] < 0.$$

Parameters $k_1$, $k_2$, and $\tau_e$ are parameters of the learned OVRV model.

If the inequality does not hold true, then the ego vehicle 100 may predict that the traffic in the target lane 104 will be string unstable.

In step 350, the ego vehicle changes lanes from a current lane to the target lane in response to determining that the vehicles in the target lane will be string stable responsive to the ego vehicle moving into the target lane. For example, if the predicted oscillation propagated over the vehicles in the target lane 104 decreases as illustrated in FIG. 4B, then the ego vehicle 100 changes lanes from the lane 102 and target lane 104 without causing traffic congestion or stop-and-go traffic jam.

Figure 5:
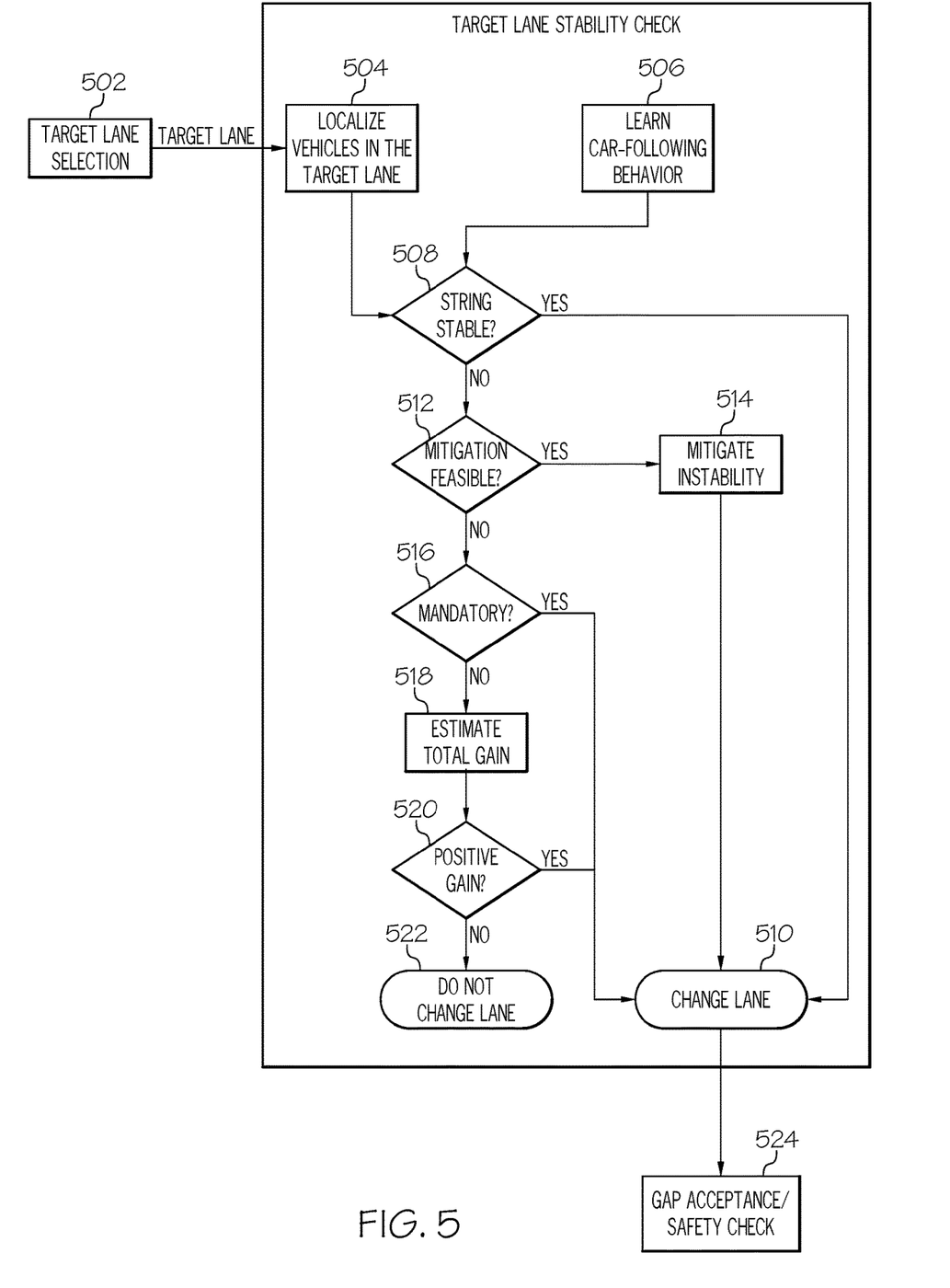
FIG. 5 depicts an overall flowchart of predicting string stability in a target lane, according to one or more embodiments shown and described herein.

FIG. 5 depicts an overall flowchart of making lane-change decisions considering stability in a target lane, according to one or more embodiments shown and described herein.

In step 502, an ego vehicle selects a target lane. For example, by referring to FIG. 4A, the ego vehicle 100 identifies an obstacle in a lane 102 and selects the target lane 104 to avoid the obstacle. In step 504, the ego vehicle 100 localizes vehicles in the target lane 104. For example, the ego vehicle 100 localizes unconnected vehicles 122, 123, 124, 125, 126 and the connected vehicle 110 in the target lane 104. In step 506, the ego vehicle 100 learns car-following behavior in the target lane 104 in a local area. As discussed above, the ego vehicle 100 may learn a car following model based on the traffic data in the target lane 104.

In step 508, the ego vehicle 100 may determine whether the vehicles in the target lane 104 will be string stable responsive to the ego vehicle 100 changing lanes from the lane 102 to the target lane 104. If it is determined that the vehicles in the target lane 104 will be string stable, the ego vehicle 100 changes lanes from the lane 120 to the target lane 104 in step 510. If it is determined that the vehicles in the target lane 104 will be string unstable, the ego vehicle 100 may determine whether there is a feasible mitigation strategy in step 512. If there is a feasible mitigation strategy, the ego vehicle 100 may mitigate instability using the feasible mitigation strategy, e.g., instructing the connected vehicle 110 in the target lane 104 to change lanes or adjusting the speed profile of the connected vehicle 110 in step 514. Then, the ego vehicle 100 changes lanes from the lane 120 to the target lane 104 in step 510. If there is no feasible mitigation strategy, the ego vehicle 100 may determine whether it is mandatory for the ego vehicle 100 to change lanes in step 516. If it is mandatory for the ego vehicle 100 to change lanes, the ego vehicle 100 changes lane in step 510. If it is not mandatory for the ego vehicle 100 to change lanes, the ego vehicle 100 may estimate a total gain from changing lanes in step 518. The total gain may be calculated based on adjusted travel time of the ego vehicle and energy consumption of the vehicles following the ego vehicle in the target lane. For example, if the lane change of the ego vehicle 100 leads to instability, the action of the ego vehicle 100 can increase travel time and energy consumption of the following vehicles in the target lane. Both negative and positive impacts of the lane change actions in terms of key performance indicators (KPIs) such as safety, energy consumption, and safety are considered to estimate the total gain. If the estimated total gain is positive, the ego vehicle 100 changes lanes. If the estimated total gain is negative, the ego vehicle 100 do not change lanes to avoid the maneuver to prevent the instability and negative gain.

It should be understood that embodiments described herein are directed to a method for making lane-change decisions considering stability in a target lane responsive to an ego vehicle moving into the target lane. In embodiments, the present system learns a car following model based on training data related to a region, obtains information about vehicles in a target lane in the region, simulates movements of the vehicles in the target lane responsive to an ego vehicle moving into the target lane based on the learned car following model and the information about the vehicles, determines whether the vehicles in the target lane will be string stable responsive to the ego vehicle moving into the target lane based on the simulated movements of the vehicles in the target lane, and instructs the ego vehicle to change lanes from a current lane to the target lane in response to determining that the vehicles in the target lane will be string stable responsive to the ego vehicle moving into the target lane. Implementing the present system can improve performance of connected vehicles as well as the whole traffic system in terms of performance measures such as safety, efficiency, comfort, and reliability.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method for estimating string stability in a target lane, the method comprising:
   learning a car following model based on training data related to a region;
   obtaining information about vehicles in the target lane in the region;
   simulating movements of the vehicles in the target lane responsive to an ego vehicle moving into the target lane based on the learned car following model and the information about the vehicles;
   determining whether the vehicles in the target lane will be string stable responsive to the ego vehicle moving into the target lane based on the simulated movements of the vehicles in the target lane; and
   instructing the ego vehicle to change lanes from a current lane to the target lane in response to determining that the vehicles in the target lane will be string stable responsive to the ego vehicle moving into the target lane.

2. The method of claim 1, wherein determining whether the vehicles in the target lane will be string stable responsive to the ego vehicle moving into the target lane comprise:

determining whether an oscillation propagated over the vehicles in the target lane decreases based on the simulated movements of the vehicles in the target lane; and determining that the vehicles in the target lane will be string stable responsive to the ego vehicle moving into the target lane in response to determining that the oscillation propagated over the vehicles in the target lane decreases.

3. The method of claim 1, wherein determining whether the vehicles in the target lane will be string stable responsive to the ego vehicle moving into the target lane comprise:

determining whether an oscillation propagated over the vehicles in the target lane decreases based on the simulated movements of the vehicles in the target lane; and determining that the vehicles in the target lane will be string unstable responsive to the ego vehicle moving into the target lane in response to determining that the oscillation propagated over the vehicles in the target lane increases.

4. The method of claim 1, further comprising:

obtaining parameters of the learned car following model; and determining whether the vehicles in the target lane will be string stable responsive to the ego vehicle moving into the target lane based on the parameters of the learned car following model.

5. The method of claim 1, wherein the car following model is one of an optimal velocity model (OVM), intelligent driver model (IDM), and a Gipps car following model.

6. The method of claim 1, further comprising:

determining whether a lane change of the ego vehicle is mandatory in response to determining that the vehicles in the target lane will be string unstable responsive to the ego vehicle moving into the target lane; and instructing the ego vehicle to change lanes from the current lane to the target lane in response to determining that the lane change of the ego vehicle is mandatory.

7. The method of claim 6, further comprising:

estimating a total gain for a discretionary lane change of the ego vehicle in response to determining that the lane change of the ego vehicle is not mandatory;

instructing the ego vehicle to change lanes from the current lane to the target lane in response to determining that the total gain is positive; and preventing the ego vehicle from changing lanes from the current lane to the target lane in response to determining that the total gain is negative.

8. The method of claim 1, wherein the training data includes input data including a distance between a first vehicle and second vehicle leading the first vehicle, a speed of the first vehicle, a speed difference between the first vehicle and the second vehicle, and an output data including an acceleration of the first vehicle.

9. The method of claim 1, wherein the information about the vehicles in the target lane includes location information about the vehicles, speeds of the vehicles, gaps among the vehicles, and speed differences between two adjacent vehicles.

10. The method of claim 1, wherein the information about the vehicles in the target lane includes at least one of a vehicle density in the target lane and a number of vehicles between the ego vehicle and a cooperating vehicle in the target lane.

11. The method of claim 1, further comprising:

activating a mitigation strategy in response to determining that the vehicles in the target lane will be string unstable responsive to the ego vehicle moving into the target lane.

12. A system for estimating string stability in a target lane, the system comprising:

a processor programmed to perform operations comprising:

learning a car following model based on training data related to a region;

obtaining information about vehicles in the target lane in the region;

simulating movements of the vehicles in the target lane responsive to an ego vehicle moving into the target lane based on the learned car following model and the information about the vehicles;

determining whether the vehicles in the target lane will be string stable responsive to the ego vehicle moving into the target lane based on the simulated movements of the vehicles in the target lane; and instructing the ego vehicle to change lanes from a current lane to the target lane in response to determining that the vehicles in the target lane will be string stable responsive to the ego vehicle moving into the target lane.

13. The system of claim 12, wherein determining whether the vehicles in the target lane will be string stable responsive to the ego vehicle moving into the target lane comprise:

determining whether an oscillation propagated over the vehicles in the target lane decreases based on the simulated movements of the vehicles in the target lane; and determining that the vehicles in the target lane will be string stable responsive to the ego vehicle moving into the target lane in response to determining that the oscillation propagated over the vehicles in the target lane decreases.

14. The system of claim 12, wherein determining whether the vehicles in the target lane will be string stable responsive to the ego vehicle moving into the target lane comprise:

determining whether an oscillation propagated over the vehicles in the target lane decreases based on the simulated movements of the vehicles in the target lane; and determining that the vehicles in the target lane will be string unstable responsive to the ego vehicle moving into the target lane in response to determining that the oscillation propagated over the vehicles in the target lane increases.

15. The system of claim 12, wherein the operations further comprise:

obtaining parameters of the learned car following model; and determining whether the vehicles in the target lane will be string stable responsive to the ego vehicle moving into the target lane based on the parameters of the learned car following model.

16. The system of claim 12, wherein the operations further comprise:

determining whether a lane change of the ego vehicle is mandatory in response to determining that the vehicles in the target lane will be string unstable responsive to the ego vehicle moving into the target lane; and instructing the ego vehicle to change lanes from the current lane to the target lane in response to determining that the lane change of the ego vehicle is mandatory.

17. The system of claim 16, wherein the operations further comprise:
estimating a total gain for a discretionary lane change of the ego vehicle in response to determining that the lane change of the ego vehicle is not mandatory;
instructing the ego vehicle to change lanes from the current lane to the target lane in response to determining that the total gain is positive; and
preventing the ego vehicle from changing lanes from the current lane to the target lane in response to determining that the total gain is negative.

18. The system of claim 12, wherein the training data includes input data including a distance between a first vehicle and second vehicle leading the first vehicle, a speed of the first vehicle, a speed difference between the first vehicle and the second vehicle, and an output data including an acceleration of the first vehicle.

19. The system of claim 12, wherein the information about the vehicles in the target lane includes location information about the vehicles, speeds of the vehicles, gaps among the vehicles, and speed differences between two adjacent vehicles, and
wherein the information about the vehicles in the target lane includes at least one of a vehicle density in the target lane and a number of vehicles between the ego vehicle and a cooperating vehicle in the target lane.

20. A vehicle comprising:
one or more sensors configured to obtain information about vehicles in a target lane in a region;
a processor programmed to perform operations comprising:
learning a car following model based on training data related to the region;
simulating movements of the vehicles in the target lane responsive to the vehicle moving into the target lane based on the learned car following model and the information about the vehicles;
determining whether the vehicles in the target lane will be string stable responsive to the vehicle moving into the target lane based on the simulated movements of the vehicles in the target lane; and
instructing the vehicle to change lanes from a current lane to the target lane in response to determining that the vehicles in the target lane will be string stable responsive to the vehicle moving into the target lane; and
an actuator configured to drive the vehicle to change lanes from the current lane to the target lane.

* * * * *